United States Patent [19]

Schebesta et al.

[11] Patent Number: 5,658,075
[45] Date of Patent: Aug. 19, 1997

[54] SELF-CLEANING REACTOR/MIXER FOR HIGHLY VISCOUS AND SOLIDS-BEARING MATERIALS TO BE MIXED

[75] Inventors: Klaus Schebesta; Heinrich Schuchardt; Martin Ullrich, all of Leverkusen, Germany

[73] Assignee: Bayer Aktiengesellschaft, Leverkusen, Germany

[21] Appl. No.: 564,533

[22] Filed: Nov. 29, 1995

[30] Foreign Application Priority Data

Dec. 5, 1994 [DE] Germany .......................... 44 43 154.6
Jul. 21, 1995 [DE] Germany .......................... 195 26 654.4

[51] Int. Cl.$^6$ ........................................ B29B 7/48
[52] U.S. Cl. .............. 366/97; 366/298; 366/301; 366/312
[58] Field of Search ................. 366/83–85, 96–99, 366/144, 147, 297–301, 309, 312, 313; 425/204, 208, 209; 99/348

[56] References Cited

U.S. PATENT DOCUMENTS

| | | | |
|---|---|---|---|
| 2,964,391 | 12/1960 | Benson | 366/301 X |
| 3,687,422 | 8/1972 | List | 366/299 X |
| 3,689,035 | 9/1972 | List | 366/85 X |
| 4,556,324 | 12/1985 | Tynan | 366/301 X |
| 4,650,338 | 3/1987 | List et al. | 366/97 X |
| 4,857,632 | 8/1989 | Ahlberg et al. | 366/97 X |
| 4,941,130 | 7/1990 | List et al. | 366/99 |
| 4,950,081 | 8/1990 | List | 366/299 X |
| 5,230,562 | 7/1993 | Nishimi et al. | 366/298 |
| 5,334,358 | 8/1994 | Schuchardt et al. | 366/297 X |
| 5,399,012 | 3/1995 | Schuchardt et al. | 366/97 |
| 5,407,266 | 4/1995 | Dotsch et al. | 366/147 X |
| 5,505,536 | 4/1996 | Schuchardt | 366/97 |

FOREIGN PATENT DOCUMENTS

| | | |
|---|---|---|
| 0460466 | 12/1991 | European Pat. Off. . |
| 0528210 | 2/1993 | European Pat. Off. . |
| 0638354 | 2/1995 | European Pat. Off. . |
| 60-5226 | 1/1985 | Japan .......................... 366/301 |
| 1505792 | 9/1989 | U.S.S.R. ....................... 366/301 |

Primary Examiner—Charles E. Cooley
Attorney, Agent, or Firm—Sprung Horn Kramer & Woods

[57] ABSTRACT

A self-cleaning reactor/mixer, in particular a disk reactor, with a large available useful capacity, which cleans itself kinematically, comprising at least two or more parallel shafts rotating in the same direction, on which axially offset, not necessarily circular disks with scrapers distributed on their circumference are situated, and a surrounding housing. The reactor/mixer on account of the special geometry of its rotors, which extensively avoids acute product-side angles, is particularly suitable for processing solids-bearing materials to be mixed.

14 Claims, 8 Drawing Sheets

SELF-CLEANING REACTOR/MIXER FOR HIGHLY VISCOUS AND SOLIDS-BEARING MATERIALS TO BE MIXED

BACKGROUND OF THE INVENTION

The invention relates to a self-cleaning reactor/mixer, in particular a disk reactor, with a large available useful capacity, which cleans itself kinematically, comprising at least two or more parallel shafts rotating in the same direction, on which axially offset, not necessarily circular disks with scrapers distributed on their circumference are situated, and a surrounding housing.

The mixer is used in process engineering to process fluids and cohesive bulk materials. The mixer is extensively self-cleaning kinematically and has a large available useful capacity.

In process engineering, when producing and processing i.a. plastic materials and rubber, it is necessary to treat highly viscous fluids. In particular, apparatuses are required for mixing, evaporation and reaction purposes. Said apparatuses have to enable a good mixing action and, in the case of evaporation, also enable rapid renewal of the free surfaces.

Product deposits on the walls of such mixers, e.g. in the case of polymerization reactions, may lead to impairment of the process. Undesired side reactions are encouraged in the deposits on account of the substantially prolonged retention time. This leads to contamination of the product. Product deposits on the walls may be avoided by kinematic self-cleaning of the mixer.

To minimize apparatus costs, there should be the largest possible capacity available for the material to be mixed.

A known solution to the described problem is possible with the aid of multi-axis disk reactors. The basic construction of such a reactor is described i.a. in the specification FR-A-1 197 720.

European application EP 0 460 466 A1 describes how the scrapers of a disk reactor may be designed for rotation in opposite directions or in the same direction in order to achieve kinematic cleaning of the scrapers and extensive cleaning of the complete reactor.

DE-OS 41 26 425 A1 describes a reactor with contrarotating shafts, which is completely kinematically self-cleaning.

In JP-A-63 232 828, a reactor rotating in the same direction is illustrated as an example, which is completely self-cleaning but limited to an available useful capacity of less than 62%.

What all of the three above-mentioned mixers have in common is that, during scraping of the housing wall, there is a product-side angle (see also FIG. 8) of less than 60° between the housing wall and the scraper surface. Such mixers are however not very suitable or totally unsuitable for mixing solids-bearing and extremely viscous materials since the material to be mixed or the solid rapidly becomes compacted and compressed between the housing wall and the scrapers, causing subsequent blocking of the rotor.

SUMMARY OF THE INVENTION

The object of the invention was to find a reactor/mixer which offers the advantages of the known mixers—a maximum degree of self-cleaning and a maximum useful capacity for the material to be mixed—and at the same time is capable of mixing solids-bearing material without difficulty.

According to the invention, said object is achieved by a reactor/mixer comprising two or more parallel shafts rotating in the same direction, on which axially offset disks with a not necessarily circular circumference and with scrapers distributed on their circumference are situated, and a surrounding housing. Said reactor/mixer is characterized in that all of the surfaces of the scrapers are kinematically cleaned, that, particularly in the case of shafts rotating at identical speed, in any radial section through the mixer all of the outwardly directed surfaces of the scrapers of a shaft, if they are cleaned by the housing, are concentric with the centre of rotation but otherwise substantially have the distance between axes as a radius of curvature and are convex and are cleaned by an adjacent shaft or the scrapers of said shaft, that, particularly in the case of rotors rotating at identical speed, all of the inwardly directed surfaces of the scrapers of a shaft in any radial section through the mixer substantially have the distance between axes as a radius of curvature and are concave and are cleaned by scrapers of another adjacent shaft, that, during cleaning of the housing by the scrapers, only product-side angles greater than 90° arise between the housing wall and the cleaning surface of the scraper, that, during mutual cleaning of the scrapers, only product-side angles greater than 60°, preferably greater than or equal to 90°, arise between the cleaned and the cleaning surface of the scrapers in contact with one another.

In the present context, cleaning is understood to be the closest possible approach of said parts of the reactor during rotation of the rotors which may be achieved while taking the manufacturing tolerances into account, so that said parts may slide past one another without blocking rotation of the axes.

In the present context, rotor is understood to be the, in each case, coherent unit comprising shaft, disks and scrapers.

The housing and rotors of the mixers according to the invention may be provided with basically known cooling or heating devices in order, for example, to enable influencing of the reaction course inside the reactor/mixer. Ports for degassing discharge lines or for supply and discharge lines for the material to be mixed as well as for the connection of measuring instruments may be provided on the housing.

The built-in mixer parts (rotors) according to the invention described here may be combined in any desired combination with known mixing, kneading or screw elements and other conveying elements.

A suitable selection of the arrangement of the scrapers is not a trivial matter. Rather, preferred solutions are possible depending on the speed ratio, the ratio of diameter to distance between axes or the number of scrapers.

There follows a description of preferred twin-axis mixers according to the invention, in which all of the scrapers in a radial section are congruent and their rotors rotate at the same speed and in the same direction.

On the basis of said description, expansion to three- and multi-axis mixers is possible by adding further shafts. For twin-axis mixers, there are two basically possible, preferred geometric arrangements:

1. the scrapers of the one rotor may be geometrically mapped congruently onto those of the other rotor through displacement;
2. the scrapers of the one rotor may be geometrically mapped congruently onto those of the other rotor through displacement plus rotation through half the angular pitch.

As a function of the number of scrapers, given a specific ratio of housing radius to distance between axes, suitable solutions according to the invention are possible. In the following table, only the solutions involving a ratio between the housing radius and the distance between axes greater than 0.7 are dealt with since reactors/mixers with a maximum available capacity are the preferred subject matter of the invention. In the case of the ranges of values for the ratio of housing radius to distance between axes highlighted in bold type, except for the cleaning of one surface (e.g. 31 to 34 in FIG. 3) of the scraper by the shaft only obtuse product-side angles α (greater than 90°) arise during mutual cleaning of the scrapers. In the case of the ranges of values placed in brackets, cleaning of the end faces of the disks is possibly incomplete.

Compared to said ranges of values, the ranges of values not placed in brackets are preferred.

In the present context, product-side angle α means the angle between mixer surfaces which opens at the scraper edge between scraper surface and surface to be cleaned in the direction of movement of the scraper (see FIG. 8).

Further preferred embodiments of the reactor/mixer, according to the invention are disclosed hereinafter.

The scrapers of any one shaft are disposed in a rotationally symmetric manner, and in the case of the shaft rotating more slowly or at the same speed, the scrapers are disposed in an n-times rotationally symmetric manner, n being a number greater than 3.

The scrapers of the shaft rotating more slowly or at the same speed are disposed in an n-times rotationally symmetric manner, n being a number greater than 5.

A radial section the scrapers of a shaft are geometrically mappable onto the scrapers of an adjacent shaft through displacement with subsequent rotation through half the angular pitch $$\frac{\phi_t}{2} = \frac{180°}{n}$$

in which n represents the degree of rotational symmetry.

Tables 1 and 2 show preferred ranges of the ratio of the housing inner radius to the distance between the axes of rotation.

TABLE 1

The scrapers of one shaft are mappable congruently onto those of the other shaft through displacement.

| Number of scrapers | Ratio of inner radius to distance between axes | Ratio of inner radius to distance between axes – mixer with productside angles during mutual cleaning of the scrapers constantly ≧90°– |
|---|---|---|
| 4 | | (0.708–1.000) |
| 5 | 0.700–0.703 | (0.851–1.000) |
| 6 | (0.700–0.816), 0.722–0.816 | |
| 7 | (0.700–0.924), 0.811–0.924 | |
| 8 | | (0.708–1.000), 0.904–1.000 |
| 9 | 0.700–0.722 | (0.778–1.000) |
| 10 | (0.700–0.786), 0.713–0.786 | (0.851–1.000) |
| 11 | (0.700–0.849), 0.768–0.849 | (0.925–1.000) |
| 12 | | (0.708–0.913), 0.824–0.913 |
| 13 | 0.700–0.724 | (0.755–0.976), 0.882–0.976 |
| 14 | (0.700–0.768), 0.710–0.768 | (0.802–1.000), 0.941–1.000 |
| 15 | (0.700–0.813), 0.750–0.813 | (0.851–1.000) |
| 16 | | (0.708–0.858), 0.790–0.858, |

TABLE 1-continued

The scrapers of one shaft are mappable congruently onto those of the other shaft through displacement.

| Number of scrapers | Ratio of inner radius to distance between axes | Ratio of inner radius to distance between axes – mixer with productside angles during mutual cleaning of the scrapers constantly ≧90°– |
|---|---|---|
| 17 | 0.700–0.723 | (0.900–1.000) (0.743–0.903), 0.831–0.903, (0.950–1.000) |
| 18 | (0.700–0.757), 0.709–0.757 | (0.778–0.948), 0.873–0.948 |
| 19 | (0.700–0.791), 0.740–0.791 | (0.815–0.993), 0.915–0.993 |
| 20 | | (0.708–0.826), 0.771–0.826, (0.851–1.000), 0.958–1.000 |

TABLE 2

The scrapers of one shaft are mappable congruently onto those of the other through displacement and subsequent rotation through half the angular pitch.

| Number of scrapers | Ratio of inner radius to distance between axes | Radio of inner radius to distance between axes – mixer with productside angles during mutual cleaning of the scrapers constantly ≧90°– |
|---|---|---|
| 4 | (0.700–0.840), 0.741–0.840 | |
| 5 | (0.700–1.000), 0.864–1.000 | |
| 6 | | (0.708–1.000) |
| 7 | 0.700–0.717 | (0.802–1.000) |
| 8 | (0.700–0.798), 0.716–0.798 | (0.900–1.000) |
| 9 | (0.700–0.879), 0.784–0.879 | |
| 10 | | (0.708–0.958), 0.854–0.958 |
| 11 | 0.700–0.724 | (0.764–1.000), 0.927–1.000 |
| 12 | (0.700–0.776), 0.711–0.776 | (0.822–1.000) |
| 13 | (0.700–0.829), 0.757–0.829 | (0.881–1.000) |
| 14 | | (0.708–0.881), 0.804–0.881, (0.940–1.000) |
| 15 | 0.700–0.724 | (0.748–0.934), 0.853–0.934 |
| 16 | (0.700–0.762), 0.710–0.762 | (0.789–0.987), 0.901–0.987 |
| 17 | (0.700–0.801), 0.744–0.801 | (0.830–1.000), 0.951–1.000 |
| 18 | | (0.708–0.840), 0.780–0.840, (0.872–1.000) |
| 19 | 0.700–0.723 | (0.739–0.879), 0.816–0.879, (0.915–1.000) |
| 20 | (0.700–0.753), 0.709–0.753 | (0.770–0.918), 0.852–0.918, (0.957–1.000) |

BRIEF DESCRIPTION OF THE DRAWINGS

There follows a detailed description of the invention by way of examples with reference to the drawings. The drawings show.

DETAILED DESCRIPTION OF THE INVENTION

EXAMPLES

Figure 1C:
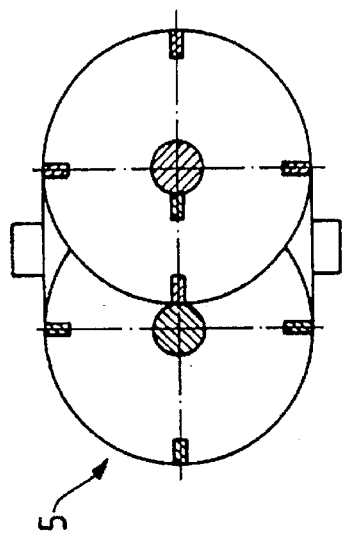
FIGS. 1a–c the basic construction of a known twin-shaft disk reactor as a section in side view (FIG. 1a), in plan view (FIG. 1b) and in cross section (FIG. 1c)
Figure 1A:
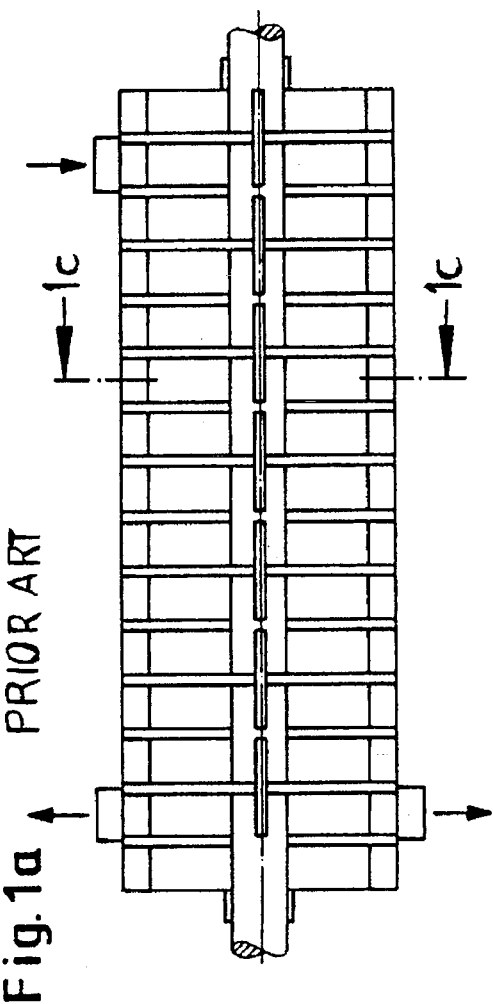
Figure 1B:
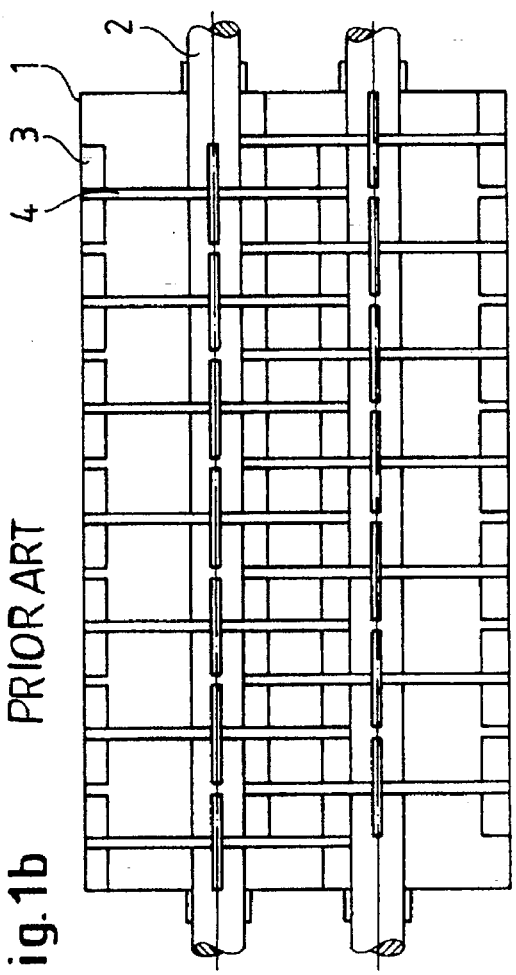

FIGS. 1a–c show the basic construction of a known, multi-shaft disk reactor 5 including housing 1, shafts 2, disks 3 and scrapers 4 (cf., for example, patent specification FR-A-1 197 720).

Radial sections through the scraper elements of the mixer according to the invention are crucial to an understanding of the kinematics. Accordingly, FIGS. 3–5 and 7 each show a section comparable to a section Ic—Ic from FIG. 1c.

Example 1

Figure 2:
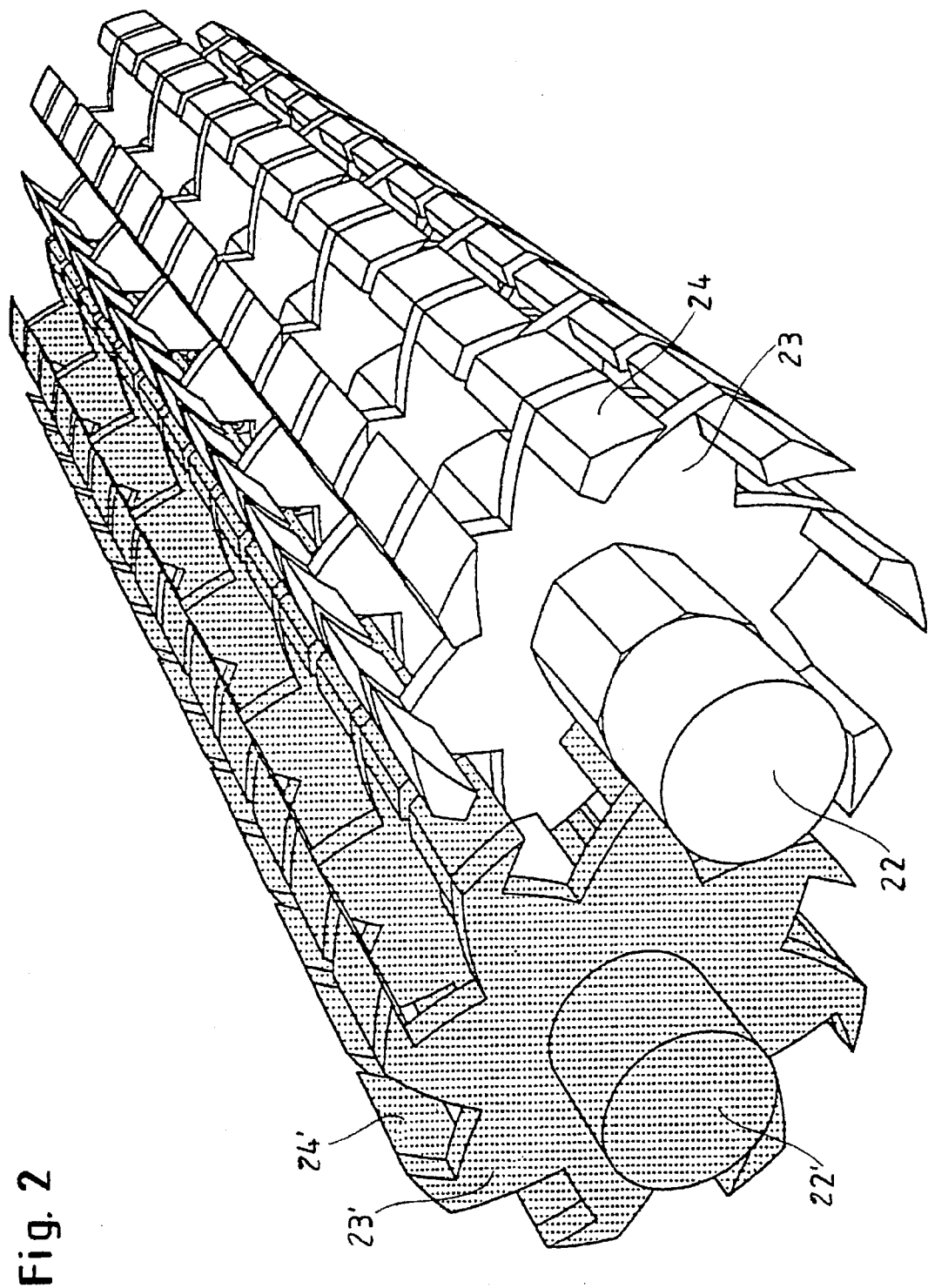
FIG. 2 a perspective view of two rotors of an embodiment of a disk reactor according to the invention without showing the housing.

FIG. 2 shows a perspective view of the shafts 22, 22', disks 23, 23' and scrapers 24, 24' of a disk reactor according to the invention. Said reactor has a ratio of the housing inner radius to the distance between axes (axes of rotation) of 0.75. The arrangement of the scrapers 24, 24' is rotationally symmetric 8 times. According to the above table, extensive cleaning of the end faces of the disks 23, 23' is possible only when the scrapers 24 of the one shaft 22 arise as a result of geometric displacement of the scrapers 24' of the other shaft 22' plus rotation through half the angular pitch (here 22.5°).

Figure 3:
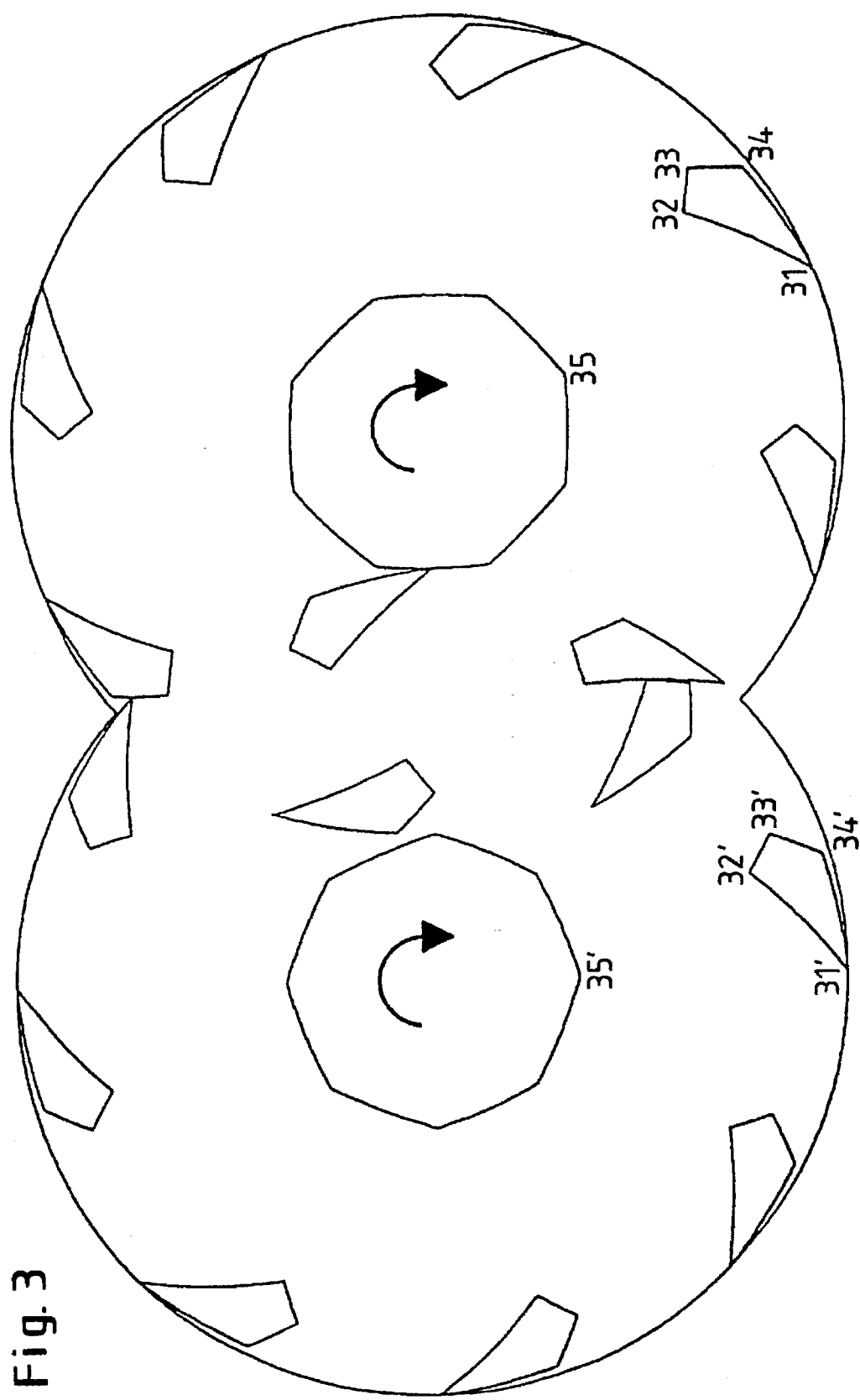
FIG. 3 a radial section corresponding to a section Ic—Ic of FIG. 1c through a disk reactor having the rotors shown in FIG. 2.

FIG. 3 shows a radial section corresponding to a section Ic—Ic of FIG. 1c through the disk reactor according to the invention having the shafts 22, 22' and scrapers 24, 24' shown in FIG. 2. The shafts 22, 22' rotate in the direction of the edges 31, 31' of the scrapers 24 and 24' respectively.

During mutual cleaning of the scrapers and cleaning of the housing by the scrapers, the following product-side angles arise.

Edges 31 clean housing 1: 143°
Edges 31 clean shaft 22': 137°–149°.
Edges 31 clean scraper surfaces 32'–33': 144°–149°.
Edges 31 clean scraper surfaces 33'–34': 96°–102°.
Edges 32 clean scraper surfaces 31'–32': 68°–82°.
Edges 35 clean scraper surfaces 31'–34': 0°–12°.

Edges 31' clean housing 1: 143°.
Edges 31' clean shaft 22: 137°–149°.
Edges 31' clean scraper surfaces 32–33: 144°–149°.
Edges 31' clean scraper surfaces 33–34: 96°–102°.
Edges 32' clean scraper surfaces 31–32: 68°–82°.
Edges 35' clean scraper surfaces 31–34: 0°–12°.

During cleaning of the scraper surfaces 31–34 by the shaft, an acute product-side angle arises. During cleaning of the surfaces 31–32, an angle greater than 60° arises. All of the other product-side angles during cleaning are greater than or equal to 90°.

Figure 4:
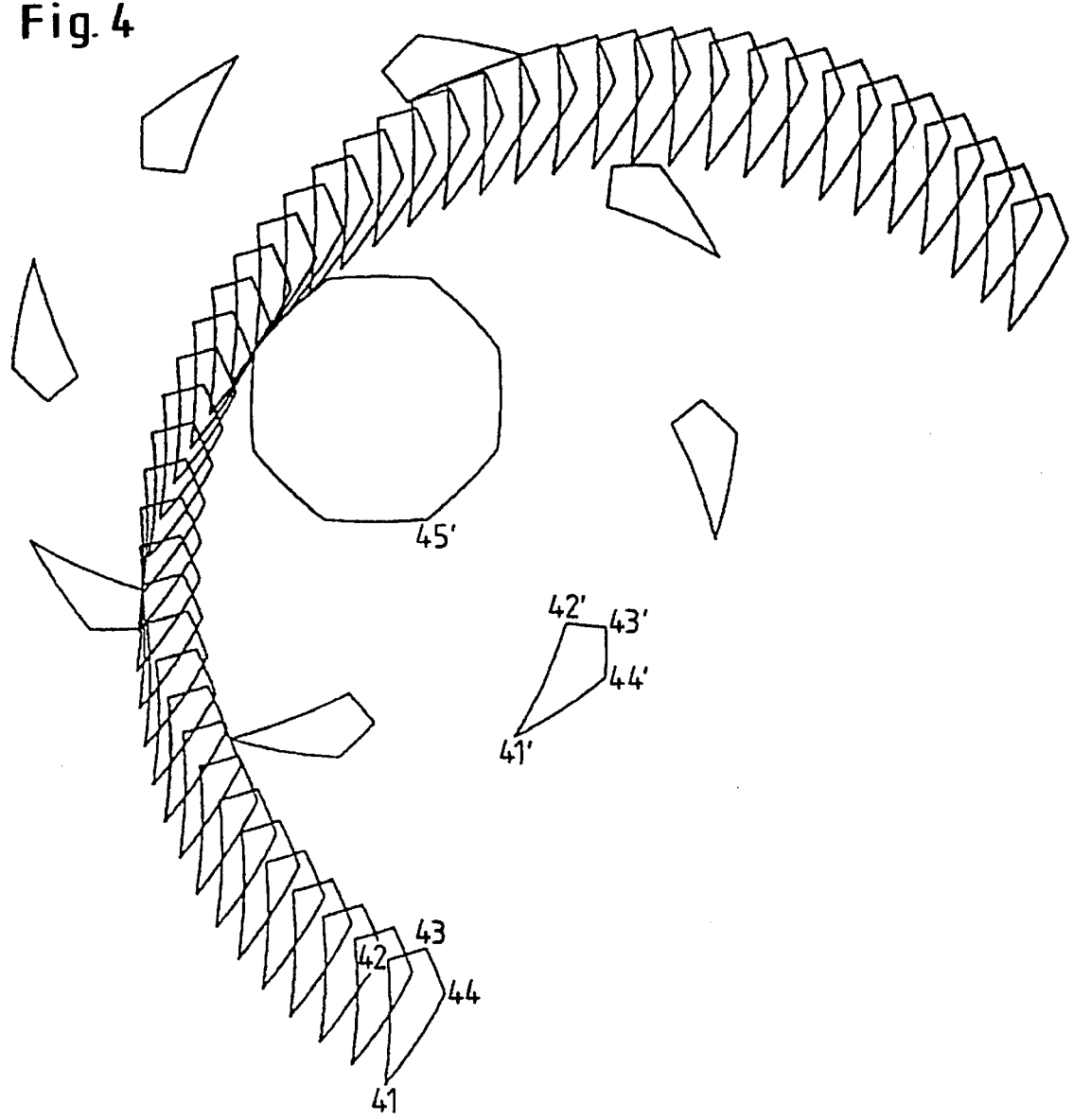
FIG. 4 one-shot displays illustrating the relative movement of a scraper 41-42-43-44 of the one rotor of a disk reactor as in FIG. 3 in relation to another rotor.

FIG. 4 shows one-shot displays illustrating the relative movement of a scraper 41-42-43-44 of the one rotor of a disk reactor as in FIG. 3 in a radial section in relation to another rotor. Said drawing clearly shows the sliding of the scraper edges past the surfaces to be cleaned.

Figure 5:
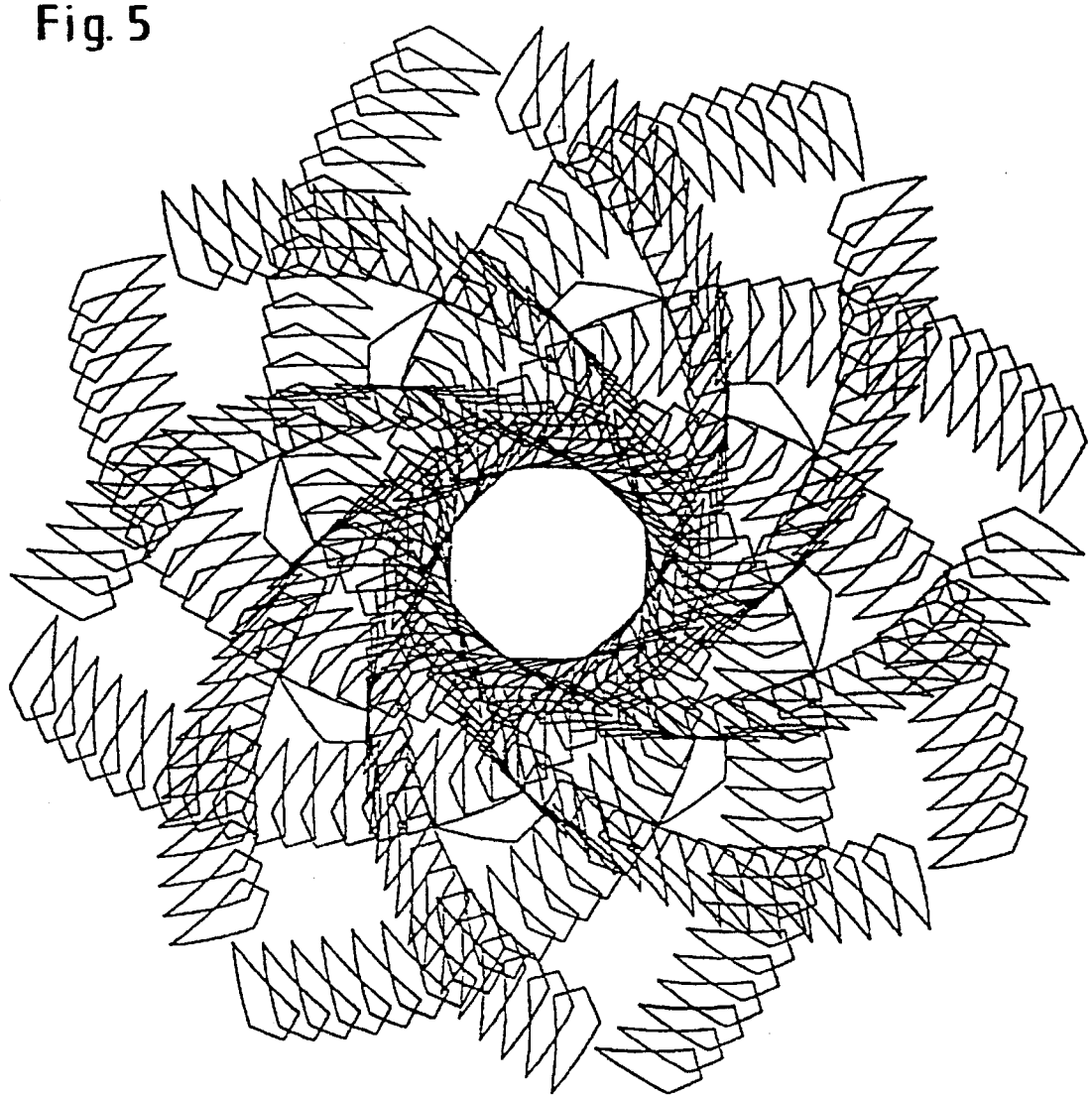
FIG. 5 one-shot displays illustrating the relative movement of all of the scrapers of a rotor in relation to another rotor of a disk reactor as in FIG. 3.

From FIG. 5 it is evident that the end faces of the disks 22 (or 22') are extensively cleaned since the relative movement of all of the scrapers of a rotor is reproduced over a disk end face.

Example 2

Figure 6:
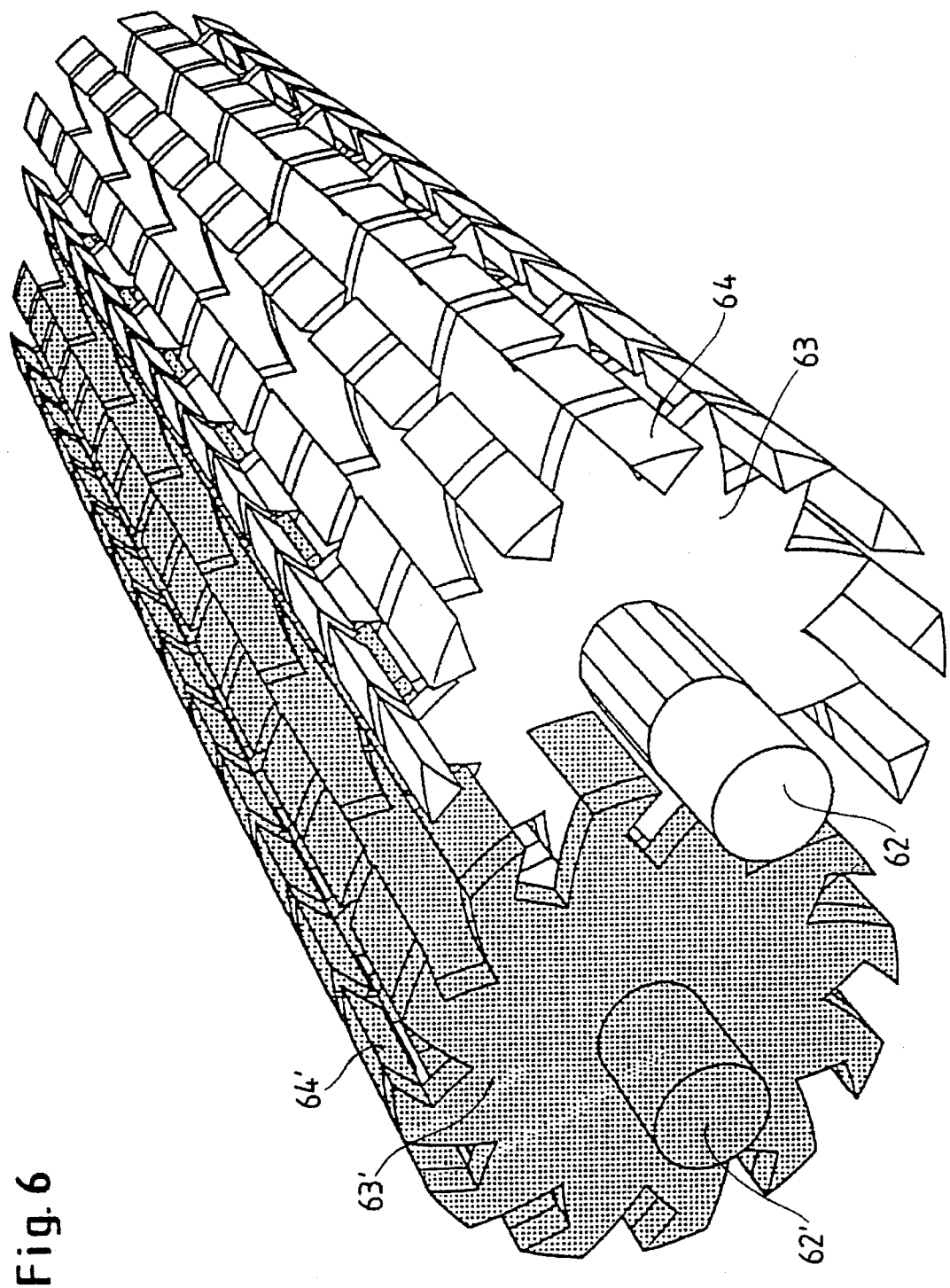
FIG. 6 a perspective view of two rotors of a further embodiment of a disk reactor according to the invention without showing the housing.

FIG. 6 is a perspective view of the shafts (62, 62'), disks (63, 63') and scrapers (64, 64') of a further embodiment of the disk reactor according to the invention. Said reactor has a ratio of the housing inner radius to the distance between axes (axes of rotation) of 0.824. Each rotor is rotationally symmetric 12 times. According to the above table, extensive cleaning of the and faces of the disks 63 is possible when the scrapers 64 of the one shaft 62 arise geometrically through displacement of the scrapers 64' of the other shaft 62'.

Figure 7:
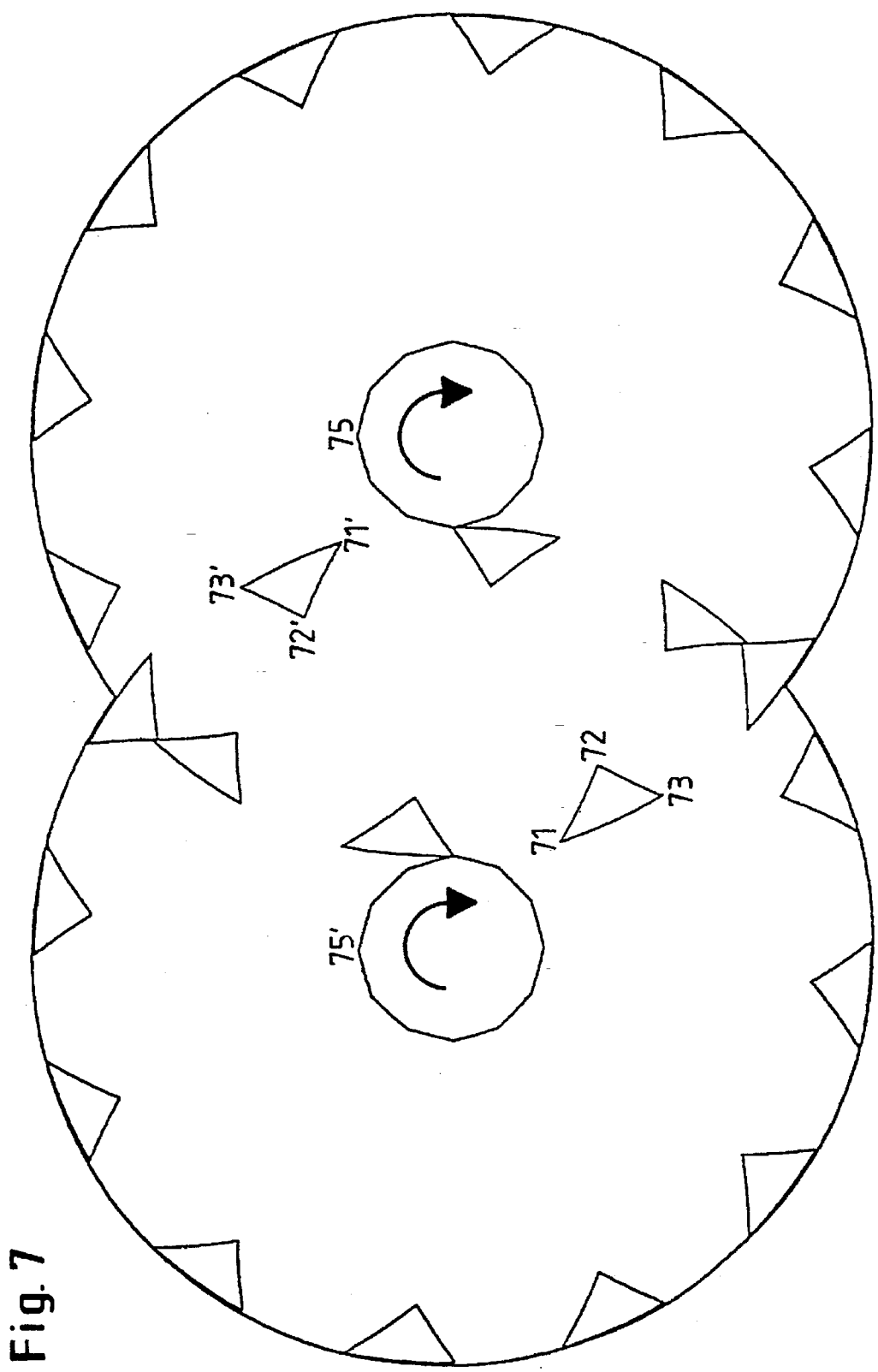
FIG. 7 a radial section corresponding to a section Ic—Ic of FIG. 1c through a disk reactor according to the invention having the rotors shown in FIG. 6.

FIG. 7 shows a radial section comparable to a section Ic—Ic from FIG. 1c through a disk reactor having the shafts (62, 62') and scrapers (64, 64') shown in FIG. 6.

During mutual cleaning of the scrapers and cleaning of the housing by the scrapers, the following product-side angles arise.

Edges 71 clean housing 1: 136°.
Edges 71 clean shaft 62': 133°–138°.
Edges 71 clean scraper surfaces 72'–73': 130°–138°.
Edges 72 clean scraper surfaces 71'–72': 90°–100°.
Edges 75 clean scraper surfaces 71'–73': 0°–5°.

Edges 71' clean housing 1: 136°.
Edges 71' clean shaft 62: 133°–138°.
Edges 71' clean scraper surfaces 72–73: 130°–138°.
Edges 72' clean scraper surfaces 71–72: 90°–100°.
Edges 75' clean scraper surfaces 71–73: 0°–5°.

During cleaning of the scraper surfaces 71–73 by the shaft, an acute product-side angle arises. All of the other product-side angles during cleaning are greater than or equal to 90°.

Figure 8:
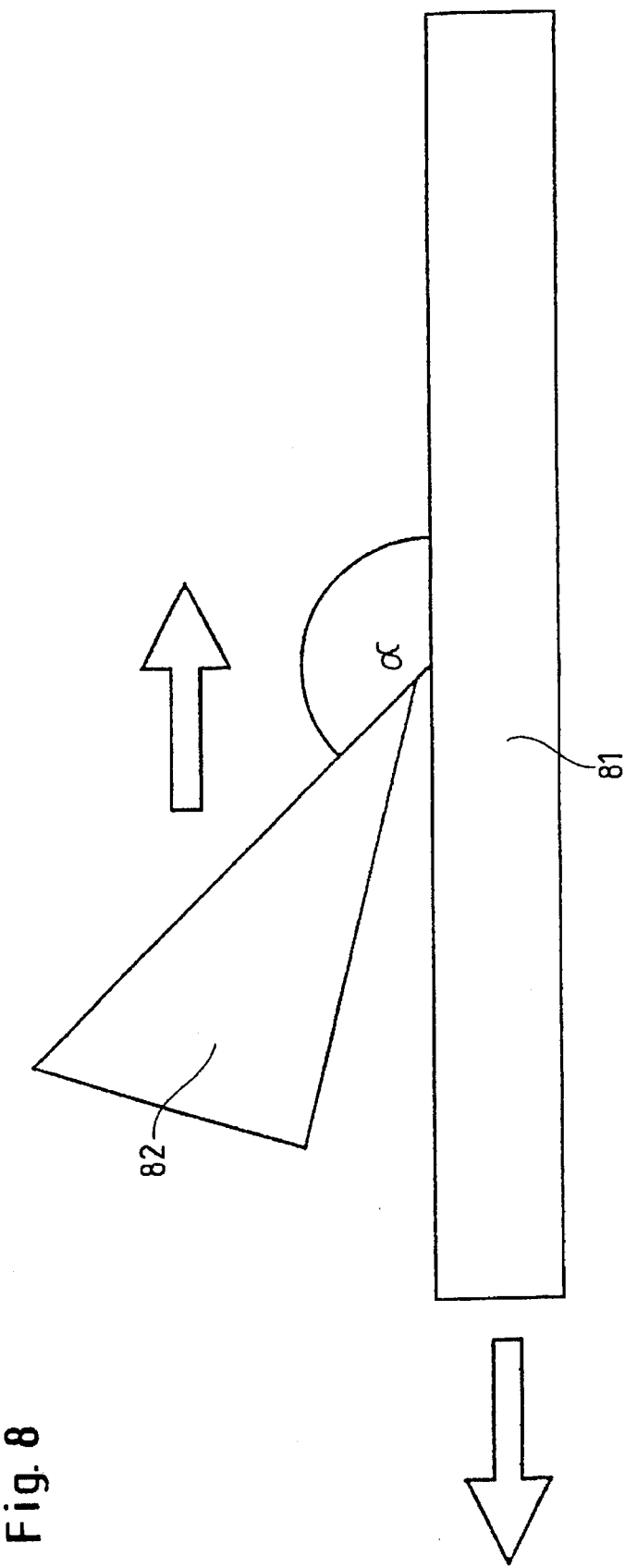
FIG. 8 a diagram explaining the term, product-side angle α.

As shown in FIG. 8, the product-side angle α is the angle between mixer surfaces which opens at the scraper 82 edge between the scraper surface and surface 81 to be cleaned in the direction of movement of the scraper.

What is claimed is:

1. A multiple shaft device providing full kinematic self-cleaning, comprising at least two parallel shafts rotatable in the same direction and having outer surfaces, axially offset disks mounted on the shafts and having a perimeter, scrapers distributed on the perimeter of the disks, wherein the scrapers having inwardly and outwardly directed surfaces, and a housing surrounding the disks and scrapers and having an inner surface, wherein at all radial sections along an axis of the device, all of the outwardly directed surfaces of the scrapers of a shaft are convex and are cleaned by one of the surface of an adjacent shaft, surfaces of scrapers of said adjacent shaft and the inner surface of the housing, wherein at all radial sections along the axis of the device, all of the inwardly directed surfaces of the scrapers of a shaft are concave and are cleaned by surfaces of scrapers of an adjacent shaft, wherein during cleaning of the inner surface of the housing by scrapers only angles of greater than 90° arise between the inner surface of the housing and each cleaning surface of the scrapers in a direction of movement of the scrapers, and wherein during cleaning of the scrapers by adjacent scrapers, only angles of greater than 60° arise between cleaned and cleaning surfaces in contact with each other in the direction of movement of the cleaning surface, whereby the inner surface of the housing, the outer surfaces of the shafts and the surfaces of the scrapers are kinematically self-cleaned.

2. The device according to claim 1, wherein the shafts rotate at one of the same speed and different speeds wherein the scrapers of each shaft are rotationally symmetric.

3. The device according to claim 2, wherein the scrapers of each shaft are n times rotationally symmetric, wherein n is greater than 3.

4. The device according to claim 2, wherein the scrapers of each shaft are n times rotationally symmetric, wherein n is greater than 5.

5. The device according to claim 1, wherein the shafts rotate at the same speed and each outwardly directed surface of the scrapers cleaned by the inner surface of the housing is concentric with a center of rotation.

6. The device according to claim 5, wherein all of the scrapers have congruent cross sections at any radial section along the axis and the number of scrapers is equal to a degree of rotational symmetry.

7. The device according to claim 6, wherein in a radial section of the scrapers of a shaft are geometrically mappable onto the scrapers of an adjacent shaft through displacement.

8. The device according to claim 7, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 4 | 0.708–1.000, |
| 5 | 0.700–0.703 or 0.851–1.000, |
| 6 | 0.700–0.816, |
| 7 | 0.700–0.924, |
| 8 | 0.708–1,000, |
| 9 | 0.700–0.722 or 0.778–1,000, |
| 10 | 0.700–0.786 or 0.851–1.000, |
| 11 | 0.700–0.849 or 0.925–1.000, |
| 12 | 0.708–0.913, |
| 13 | 0.700–0.724 or 0.755–0.976, |
| 14 | 0.700–0.768 or 0.802–1.000, |
| 15 | 0.700–0.813 or 0.851–1.000, |
| 16 | 0.708–0.858 or 0.900–1.000, |
| 17 | 0.700–0.723 or 0.743–0.903 or 0.950–1,000, |
| 18 | 0.700–0.757 or 0.778–0.948, |
| 19 | 0.700–0.791 or 0.815–0.993, |
| 20 | 0.708–0.826 or 0.851–1,000. |

9. The device according to claim 7, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 5 | 0.700-0.703, |
| 6 | 0.722–0.816, |
| 7 | 0.811–0.924, |
| 8 | 0.904–1,000, |
| 9 | 0.700–0.722, |
| 10 | 0.713–0.786, |
| 11 | 0.768–0.849, |
| 12 | 0.824–0.913, |
| 13 | 0.700–0.724 or 0.882–0.976, |
| 14 | 0.710–0.768 or 0.941–1.000, |
| 15 | 0.750–0.813, |
| 16 | 0.790–0.858, |
| 17 | 0.700–0.723 or 0.831–0.903, |
| 18 | 0.709–0.757 or 0.873–0.948, |
| 19 | 0.740–0.791 or 0.915–0.993, |
| 20 | 0.771–0.826 or 0.958–1,000. |

10. The device according to claim 7, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 8 | 0.904–1,000, |
| 12 | 0.824–0.913, |
| 13 | 0.882–0.976, |
| 14 | 0.941–1.000, |
| 16 | 0.790–0.858, |
| 17 | 0.831–0.903, |
| 18 | 0.873–0.948, |
| 19 | 0.915–0.993, |
| 20 | 0.771–0.826 or 0.958–1,000. |

11. The device according to claim 6, wherein in a radial section of the scrapers of a shaft are geometrically mappable onto scrapers of an adjacent shaft through displacement with subsequent rotation through half the angular pitch $$\phi_r = \frac{180°}{\frac{n}{2}}$$

in which n is the degree of rotational symmetry.

12. The device according to claim 11, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 4 | 0.700–0.840, |
| 5 | 0.700–1.000, |
| 6 | 0.708–1,000, |
| 7 | 0.700–0.717 or 0.802–1.000, |
| 8 | 0.700–0.798 or 0.900–1.000, |
| 9 | 0.700–0.879, |
| 10 | 0.708–0.958, |
| 11 | 0.700–0.724 or 0.764–1.000, |
| 12 | 0.700–0.776 or 0.822–1.000, |
| 13 | 0.700–0.829 or 0.881–1.000, |
| 14 | 0.708–0.881 or 0.940–1.000, |
| 15 | 0.700–0.724 or 0.748–0.934, |
| 16 | 0.700–0.762 or 0.789–0.987, |
| 17 | 0.700–0.801 or 0.830–1.000, |
| 18 | 0.708–0.840 or 0.872–1.000, |
| 19 | 0.700–0.723 or 0.739–0.879 or 0.915–1.000, |
| 20 | 0.700–0.753 or 0.770–0.918 |

-continued

| Number of scrapers | Ratio of housing inner radius to distance between axes |
|---|---|
| | or 0.957–1.000. |

13. The device according to claim 11, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 4 | 0.741–0.840, |
| 5 | 0.864–1.000, |
| 7 | 0.700–0.717, |
| 8 | 0.716–0.798, |
| 9 | 0.784–0.879, |
| 10 | 0.854–0.958, |
| 11 | 0.700–0.724 or 0.927–1.000, |
| 12 | 0.711–0.776, |
| 13 | 0.757–0.829, |
| 14 | 0.804–0.881, |
| 15 | 0.700–0.724 or 0.853–0.934, |
| 16 | 0.710–0.762 or 0.901–0.987, |
| 17 | 0.744–7.081 or 0.951–1.000, |
| 18 | 0.780–0.840, |

-continued

| Number of scrapers | Ratio of housing inner radius to distance between axes |
|---|---|
| 19 | 0.700–0.723 or 0.816–0.879, |
| 20 | 0.709–0.753 or 0.852–0.918. |

14. The device according to claim 11, wherein a ratio of an inner radius of the housing to a distance between axes of rotation of the shafts is selected as a function of the number of scrapers of a shaft in a radial section as follows:

| Number of scrapers | Ratio of housing inner radius to distance between axes |
|---|---|
| 10 | 0.854–0.958, |
| 11 | 0.927–1.000, |
| 14 | 0.804–0.881, |
| 15 | 0.853–0.934, |
| 16 | 0.901–0.987, |
| 17 | 0.951–1.000, |
| 18 | 0.780–0.840, |
| 19 | 0.816–0.879, |
| 20 | 0.852–0.918. |

* * * * *